United States Patent Office 3,450,798
Patented June 17, 1969

3,450,798
PHOSPHATE ESTERS OF HYDROXY-CARBORANES
Joseph Green, Dover, and Anatole P. Kotloby, Fair Lawn, N.J., assignors to Thiokol Chemical Corporation, Bristol, Pa., a corporation of Delaware
No Drawing. Filed Oct. 18, 1965, Ser. No. 502,790
Int. Cl. C07d *107/02, 105/04;* C08g *33/18*
U.S. Cl. 260—922                    24 Claims

ABSTRACT OF THE DISCLOSURE

Novel phosphate esters of substituted-carborane wherein the substituents include mono- or bis-hydroxyalkyl, alkylhydroxyalkyl, epoxy, and alkyl radicals, and polymers of such esters, are prepared by condensing, and in the case of the polymers by polymerizing, a phosphorus compound providing $H_3PO_4$ with the substituted-carborane at an elevated temperature. The compounds are useful as flame retardants, heat transfer materials and various resin applications.

---

This invention concerns novel organo-boron phosphorus compositions and a process for preparing them.

More particularly, this invention relates to condensation products resulting from the reaction of phosphoric acid type reactants with a hydroxylated carborane reactant selected from the group consisting of, carborane alcohols, carborane diols and carborane polyols. These condensation products are useful as flame retardants, heat transfer materials and various resin applications.

The term "carborane alcohols," "carborane diols," and "carborane polyols" as used throughout this application is used to describe compounds containing at least one carborane group as well as one, two, or more reactive hydroxy groups, respectively.

Carborane, the carboranyl radical of which is abbreviated throughout this application as A, is the generic term used to describe all the isomers of the dicarbaclovododecaborane of the empirical formula: $B_{10}C_2H_{12}$.

The term "carboranyl" is the name given to the radical of the ortho carborane isomer shown below:

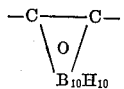

The ortho isomer is also referred to by the Greek letter theta, abbreviated as θ.

The radical of the para-isomer of carborane is referred to herein as "paracarboranyl" and is abbreviated as Ⓟ.

The radical of the meta isomer of carborane is referred to as "neocarboranyl," abbreviated as ⊕.

The term phosphoric acid type reactant(s) used throughout this application refers to compositions selected from the group consisting of $H_3PO_4$, and any other reactants which under the inventive reaction conditions are a source of $H_3PO_4$.

Within recent years there has been an increasing need for polymeric materials which can be used as flame retardant resins and as additives for preparing flame retardant resins. These resins presently are valuable for a variety of aerospace and commercial applications and the need for additional materials is rapidly increasing. Because of the limited number of polymeric materials possessing flame retardant properties the preparation of new polymers and monomers represent a significant advance in the art.

Thus, it is an object of this invention among others to prepare novel monomers and polymers containing the carborane nucleus.

It is an additional object to prepare monomers and polymers useful as flame retardants and flame retardant additives.

Additional objects will become apparent after a further reading of this application.

The above objects are achieved by contacting a hydroxylated carborane reactant selected from the group of ortho-carboranyl, meta-carboranyl and paracarboranyl-alcohols, diols, and polyols with concentrated phosphoric acid or a source of concentrated phosphoric acid at elevated temperatures, until water is evolved and a phosphate product is formed. While concentrated phosphoric acid of about 60% by weight or higher can be used, much higher acid concentrations are preferred. The carborane condensation products whether ortho, meta or para can be isolated from the reaction mixture by solvent extraction, vacuum distillation or by some other separation procedure.

In the favored practice a carboranyl alcohol or diol such as the hydroxy-lower alkylcarborane or bis(hydroxy-lower alkylcarborane) is reacted with a phosphoric acid reactant such as $H_3PO_4$, or a source of phosphoric acid, at a temperature ranging from about 50-250° C., until water is split out from the hydroxylated carborane reactant and a significant quantity of condensation product is formed.

In the preferred practice a 1,2-bis(hydroxy-loweralkyl) carborane or 1-hydroxy-loweralkyl carborane, whose alkyl group has from 1-4 carbon atoms, is reacted with at least a stoichiometric quantity of $H_3PO_4$ at temperatures ranging from about 90-150° C. until water is split out and significant quantities of ester product is formed. The product which is ordinarily formed within 6-48 hours under the preferred reaction temperatures is generally filtered off and taken up with an inert solvent such as the dialkyl ethers. The ether solution is then dried and concentrated to give the phosphate ester product.

The ester products of this invention are either cyclic or linear in structure depending upon a number of factors including the isomer used, the number of hydroxyl groups in the carborane reactant and the number of carbons in the alkyl group. When the hydroxylated carborane reactant has one hydroxyl group only linear ester products are formed.

When the hydroxylated carborane is a diol such as the bis(hydroxyalkyl) carborane, and the alkyl group is ethyl or greater, a linear polymeric product is preferentially formed. When the alkyl group is methyl i.e., bis(hydroxymethyl) carborane is the reactant, a cyclic product of the type shown below is formed:

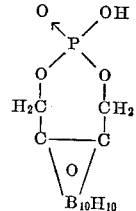

While the conditions described above represent the preferred reaction conditions for preparing the phosphate esters of 1,2,bis(hydroxy-lower alkyl) and 1-hydroxy-lower alkyl carboranes considerably more latitude is possible to prepare the other compounds within the inventive concept.

For example the reaction can be run between about 50–250° C. at pressures ranging from sub- through superatmospheric conditions. However, below 90° C. the reaction time is unduly protracted and for this reason temperatures below this are not favored. At the higher temperature range, above 150° C. while the reaction proceeds more rapidly other problems arise. These include competing side reactions to produce the carborane ethers, degradation and isomerization of the desired product. For these reasons 90–150° C. represents the favored range.

Similarly while sub- or superatmospheric pressures may be used they offer little practical advantage. Therefore, atmospheric or near atmospheric pressures are favored.

Since reaction times are a function of temperature and the particular reactants used they cannot be stated with precision. However, ordinarily the reaction would be complete between about 10–96 hours with 6–48 hours being an average time range when the process is run under the aforementioned preferred temperature and pressure conditions.

As indicated earlier while the bis(hydroxy-lower alkyl) ortho carboranes or -hydroxy-lower alkyl ortho carboranes whose alkyl groups have from 1–4 carbon atoms, are favored, other hydroxyalkyl ortho carboranes, mono or bis having longer chain alkyl groups can be utilized, as can be the corresponding mono and bis(hydroxalkyl) meta and paracarboranes. For example, all of the following hydroxy carboranes can be utilized:

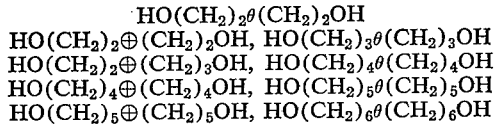

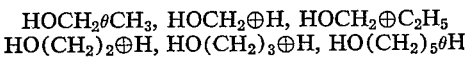

$HO(CH_2)_6 \oplus (CH_2)_6OH$, as well as the mono hydroxyalkyl compounds. The latter include $HOCH_2\theta H$,

$HO(CH_2)_6 \oplus CH_3$, etc. as well as the corresponding mono and bis(hydroxyalkyl) paracarboranes. In addition hydroxycarboranes containing an ether linkage can also be used as reactants. These have the generic formula of $$HO(CH_2)_nAOA(CH_2)_nOH$$

wherein A is the generic abbreviation for the carboranyl radical of the various carborane isomers and $n$ is an integer. These ethers react as do the corresponding diols since the inert ether function does not take part in the reaction.

Ordinarily no solvent is required in the inventive process when $H_3PO_4$ is used as reactant and excess $H_3PO_4$ serves the dual purpose of acting as solvent and as the phosphating source. The excess of $H_3PO_4$ used is not critical but will generally range from twice the stoichiometric amount required upward. The $H_3PO_4$ reactant can be used by itself or the $H_3PO_4$ can be generated in-situ from an appropriate source.

To illustrate the preparation of typical carborane phosphates the following illustrative embodiments are submitted. The first group of embodiments illustrate the preparation of linear and cyclic phosphates of carboranyl alcohols and carboranyl diols.

The following embodiments illustrate the preparation of phosphates of the hydroxylated ortho carboranes ($\theta$).

In a suitable reaction vessel having heating, cooling, and stirring means are added 6.5 parts by weight of $HOCH_2\theta H$ and 60.0 parts by weight of commercially obtained polyphosphoric acid. The suspension is heated with stirring to 110–115° C. for 20–24 hours. At the end of this time the reaction is halted and the reaction mixture cooled down to room temperature and diluted with 300 parts by weight of water. The fine precipitate of product is filtered off and taken up into diethylether. The ether solution is dried over anhydrous $MgSO_4$ and evaporated down to a residue. A more purified product can be obtained by recrystallization from tetrahydrofuran. Elemental analysis and infrared analysis indicate that the expected phosphate product is formed.

In an analogous embodiment the same product is prepared by reacting the same carborane reactant and a tenfold excess of $P_2O_5$.

In another embodiment, a linear phosphate ester compound is prepared by heating 10 parts by weight of $HO(CH_2)_2\theta H$ and 60 parts by weight of concentrated $H_3PO_4$ to 120° C. for 32–36 hours to complete the reaction. At the end of this time the reaction is halted and the reaction mixture cooled to room temperature. The cooled reaction mixture is diluted with 750 parts by weight of water to precipitate the product. The product is filtered off and taken up into ether. The ether solution is evaporated down to a solid product. Analytical evidence confirmed the desired structure is obtained.

In another reaction a polymeric phosphate is prepared by reacting 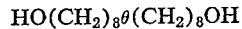 and $H_3PO_4$ at 125–135° C. for 48 hours. The reaction mixture is cooled and diluted with 600 parts by weight of water to precipitate the product and filtered. The filtered product is extracted with ethyl ether and evaporated to a solid residue. The residue upon analysis is shown to be a linear polymeric product.

In yet another embodiment, a polymeric phosphate is prepared by reacting equimolar portions of $$HO(CH_2)_8\theta(CH_2)_8OH$$

and $H_3PO_4$ at 125–135° C. for 48 hours.

In a related embodiment a polymeric phosphate is prepared by reacting 1,2 bis(hydroxy-n-pentyl) carborane and $H_3PO_4$ at 125–135° C. for 48 hours. At the end of this time the reaction is halted, cooled, and diluted with 400 parts by weight of water to precipitate the product. The product is extracted with ether and evaporated to give a crystalline residue. Analytical evidence confirms that the desired polymer is formed.

In a related embodiment a homologous polymer is prepared by reacting equimolar portions of

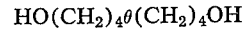

and $H_3PO_4$ under the same conditions described above.

The following embodiments illustrate the preparation of the analogous phosphate esters of the hydroxylated neocarboranes.

In a suitable reaction vessel having heating, cooling and stirring means are added 13.0 parts by weight of $HOCH_2 \oplus H$ and 120 parts by weight of $H_3PO_4$. The suspension is heated with stirring to 120–130° C. for 26–30 hours. At the end of this time the reaction is halted and the reaction mixture cooled down to room temperature and diluted with 600 parts by weight of water. The product which precipitates out is filtered off and taken up into diethylether. The ether solution is dried over anhydrous $MgSO_4$ and evaporated down to the phosphate product. Elemental analysis and infrared analysis indicate that the desired linear product had formed.

In related embodiment, the neocarborane phosphate ester compound is prepared by reacting

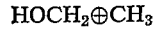

and $H_3PO_4$. The preparation is performed as follows.

To a reaction vessel similar to the one described above is added equimolar portions of the above neocarborane reactant and $H_3PO_4$. The stirred suspension of the two reactants are heated to 120–124° C. for 32–36 hours to complete the reaction. At the end of this time the reaction is halted and the reaction mixture cooled to room temperaure and diluted with 1000 parts of water to precipitate the phosphate product. The product is filtered off and the product taken up into butyl ether. The ether is dried and evaporated off. Analysis indicates the expected product is formed.

The above reaction is repeated to prepare the related phosphates by utilizing $HO(CH_2)_3 \oplus H$ and

as the reactant instead of the hydroxylated neocarborane as shown in the embodiment supra.

In a suitable reaction vessel having heating, cooling, and stirring means are added 65 parts by weight of $CH_3 \oplus (CH_2)_2OH$ and 60 parts by weight of polyphosphoric acid. The suspension is heated with stirring to 110–115° C. for 20–24 hours. At the end of this time the reaction is halted and the reaction mixture cooled down to room temperature and diluted with 300 parts by weight of water. The fine precipitate of product is filtered off and taken up into diethylether. The ether solution is dried over anhydrous MgSO₄ and evaporated down to a crystalline white solid. A more purified product is obtained by recrystallization. Elemental analysis and infrared indicate that the expected linear carborane phosphate is the product.

In analogous embodiments linear phosphate products are prepared by reacting HO(CH₂)₆⊕(CH₂)₆OH and

HO(CH₂)₈⊕(CH₂)₈OH with polyphosphoric acid under the same reaction conditions described above.

In another embodiment illustrating the preparation of a phosphate product the following preparation is submitted.

An equimolar reaction mixture of HOCH₂⊕CH₂OH and polyphosphoric acid are heated to 125–130° C. for 50 hours. The cooled reaction mixture is diluted with 600 parts by weight of water and taken up into butyl ether. The ether is stripped off to give the desired polymer product.

As indicated by the embodiments above when the alkyl group of the hydroxylated alkyl carborane such as the 1,2-bis(hydroxyalkyl) carborane has an alkyl group of 2 or more carbon atoms, a polymeric product is formed. The generic reaction for these embodiments is given below:

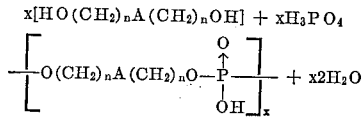

wherein A is the abbrevation for the carboranyl radical of the generic term carborane, $n$ is an integer, preferably ranging from 1 to 4, and $x$ is an integer indicating the degree of polymerization.

The 1,2-bis(hydroxyalkyl) carborane reactants of this invention can be prepared by the interaction of the diacetate ester of the appropriate acetylenic diol and 6,9-bis (acetonitrile)decaborane to yield the 1,2-bis(acetoxyalkyl) carborane. This intermediate is then hydrolysed in either aqueous acid or base to yield the 1,2-bis(hydroxyalkyl) carborane. For example, the lowest member of the series 1,2-bis(hydroxymethyl) carborane, is prepared by reacting 1,4-diacetoxy-2-butyne with 6,9-bis(acetonitrile) decaborane until the 1,2-bis(acetoxymethyl) carborane is prepared in substantial amount and then hydrolyzing with alcoholic hydrogen chloride to 1,2-bis(hydroxymethyl) carborane. Some of these reactants are disclosed in Ser. No. 324,168 filed by Green et al. on Nov. 13, 1963, now U.S. Patent 3,351,616.

Other useful carborane diol compounds are disclosed in the commonly-owned and copending application Ser. No. 269,838 of Daniel Grafstein et al., filed Mar. 28, 1963, now U.S. Patent 3,306,933.

Bis(2 - hydroxyalkyl - 1 - carboranylalkyl) ethers illustrative of the reactants of this invention are prepared by reacting bis(2-lithio-1-carboranylalkyl) ethers with alkylene oxide as disclosed in the aforementioned copending application Serial Number 269,838, filed Mar. 28, 1963. A description of the preparation of those carborane reactants also appears in Inorg. Chem. vol. 2, No. 6, Dec. 2, 1963 issue, pp. 1087–1128.

The isomeric 1-hydroxyalkylneocarboranes, the 1,2-bis(hydroxyalkyl) neocarboranes and the neocarboranyl "hydroxy" ethers of this invention as well as their isomeric para-carboranyl counterparts can be prepared by analogous methods starting with the neocarborane or paracarborane.

For example, generally 1-hydroxyethylneocarborane can be prepared by reacting a monolithio neocarborane (H—⊕—Li) with ethylene oxide. The 1,2-bis(hydroxyethyl) neocarborane is prepared by an analogous reaction of the dilithio neocarborane (Li—⊕—Li) with ethylene oxide in the presence of inert solvent. The corresponding para-carboranes are also made by the same route.

To better illustarte the inventive concept in both its composition and process aspects the following examples illustrating a preferred embodiment of this invention is submitted.

EXAMPLE 1

Preparation of cyclo(1,2-bis(hydroxylmethyl) carboranyl phosphate

In a suitable reaction vessel having heating, cooling, and stirring means are added 31 parts by weight of 1,2-bis-(hydroxymethyl) carborane and 600 parts by weight of poly-H₃PO₄. The reactants are stirred to a suspension and heated at 100–110° C. for 12–14 hours. At the end of this time the reaction is halted. The reaction mixture which has the appearance of a milky, lime-white very fine slurry is cooled to room temperature and mixed with 3000 parts by weight of water. A fine precipitate appears and this is filtered off and taken up in diethyl ether. The ether solution is dried over MgSO₄ and evaporated under vacuum. Upon evaporation a crystalline white solid is obtained. Upon recrystallization from acetonitrile the product had a melting point of 247–248.5° (uncorrected). The product is only slightly soluble in benzene, insoluble in pentane and is soluble in hot acetonitrile. The following are the analysis and molecular weight obtained on the resublimed sample.

*Analysis.*—Theory, percent: B, 40.50; C, 18.04; H, 5.62; P, 11.82. Found: B, 40.61; C, 18.05; H, 5.68; P, 11.63. Molecular weight.—Theory, 266.34. Found: 270.

The infrared spectrum of the product confirmed that the product had a carborane moiety with BH absorption at 3.8 microns. The carborane disubstitution, is revealed by the absence of absorption at 3.27 microns. This is the characteristic portion of the spectrum where the lowest number of the series, carborane shows absorption. The P—OH and P→O absorptions were at 6.0–6.15 and at 8.43 microns, respectively. The above evidence indicates that the product is the cyclo 1,2-bis(hydroxymethyl) carboranyl phosphate whose structure is shown below:

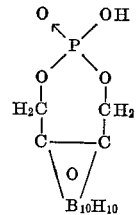

While the above structure is believed to be consistent with the above data, the inventive concept is not dependent upon any particular structure or reaction route or reaction mechanism. Numerous modifications can be made in the reaction conditions, reactants, ratio of reactants and the like without departing from the inventive concept. The metes and bounds of this invention are best determined by the claims which follow.

What is claimed is:

1. A substituted-carboranyl phosphate selected from the group consisting of phosphate of ortho-, meta- and para-carborane isomers of hydroxyalkylcarboranes, alkyl-hydroxyalkylcarboranes, 1,2 - bis(hydroxyalkylcarboranes), bis(hydroxyalkylcarboranyl) ethers, and bis(2-hydroxyalkyl - 1 - carboranylalkyl) ethers, wherein the alkyl and hydroxyalkyl groups have 1 to 8 carbon atoms.

2. A substituted-carboranyl phosphate selected from the group consisting of phosphates of hydroxyalkylcarboranes, 1,2-bis(hydroxyalkylcarboranes), bis(hydroxyalkylcarboranyl) ethers, and bis(2-hydroxyalkyl-1-carboranylalkyl) ethers wherein the alkyl group has from 1 to 8 carbon atoms.

3. The substituted-carboranyl phosphate of claim 2 where in the alkyl radical has from 1 to 4 carbon atoms.

4. A substituted-carboranyl phosphate selected from the group consisting of phosphates of hydroxyalkylneocarboranes, 1,2-bis(hydroxyalkyl) neocarboranes and bis-(hydroxyalkylneocarboranyl) ethers wherein the alkyl group has from 1 to 8 carbon atoms.

5. The substituted-carboranyl phosphate of claim 4 wherein the alkyl radical contains from 1 to 4 carbon atoms.

6. A cyclic carborane phosphate of the formula:

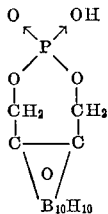

7. The substituted-carboranyl phosphate of $$HOCH_2\theta H$$

wherein $\theta$ is the symbol for the ortho-carborane isomer.

8. The substituted-carboranyl phosphate of $$HO(CH_2)_6\theta H$$

wherein $\theta$ is the symbol for the ortho-carborane isomer.

9. The substituted-carboranyl phosphate of $$HOCH_2 \oplus H$$

where $\oplus$ is meta-carborane isomer.

10. The substituted-carboranyl phosphate of $$HOCH_2 \oplus CH_3$$

wherein $\oplus$ is meta-carborane isomer.

11. The substituted-carboranyl phosphate of $$HO(CH_2)_3 \oplus H$$

wherein $\oplus$ is meta-carborane isomer.

12. The substituted-carboranyl phosphate of $$HO(CH_2)_5 \oplus H$$

wherein $\oplus$ is meta-carborane isomer.

13. The substituted-carboranyl phosphate of $$HO(CH_2)_2 \oplus CH_3$$

wherein $\oplus$ is meta-carborane isomer.

14. Polymeric substituted-carboranyl phosphate selected from the group consisting of polymeric phosphates of 1,2-bis(hydroxyalkyl) carboranes, 1,2-bis(hydroxyalkyl) neocarboranes, $HO(CH_2)_n AOA(CH_2)_n OH$, and $HO(CH_2)_n A(CH_2)_n O(CH_2)_n A(CH_2)_n OH$, wherein A is the generic abbreviation for carboranyl radical of the various carborane isomers, $n$ is an integer of from 0 to 8, and the hydroxyalkyl groups have 1 to 8 carbon atoms.

15. The polymeric substituted-carboranyl phosphate of a 1,2-bis(hydroxyalkyl) carborane whose hydroxyl alkyl groups contain from 1 to 4 carbon atoms.

16. The polymeric substituted-carboranyl phosphate of $HO(CH_2)_2\theta CH_2OH$, wherein $\theta$ is the symbol for the ortho carborane isomer.

17. The polymeric substituted-carboranyl phosphate of $HO(CH_2)_3\theta(CH_2)_3OH$, wherein $\theta$ is the symbol for the ortho carborane isomer.

18. The polymeric substituted-carboranyl phosphate of $HO(CH_2)_4\theta(CH_2)_4OH$, wherein $\theta$ is the symbol for the ortho carborane isomer.

19. The polymeric substituted-carboranyl phosphate of $HO(CH_2)_5\theta(CH_2)_5OH$, wherein $\theta$ is the symbol for the ortho carborane isomer.

20. The polymeric substituted-carboranyl phosphate of $HOCH_2 \oplus CH_2OH$, wherein $\oplus$ is the symbol for the meta-carborane isomer.

21. The polymeric substituted-carboranyl phosphate of $HO(CH_2)_6 \oplus (CH_2)_6$, wherein $\oplus$ is the symbol for the meta-carborane isomer.

22. The polymeric substituted-carboranyl phosphate of $HO(CH_2)_3 \oplus (CH_2)_3 OH$, wherein $\oplus$ is the symbol for the meta-carborane isomer.

23. A polymeric carboranyl phosphate of $$HO(CH_2)_6 \oplus O \oplus [-](CH_2)_n OH$$

wherein $\oplus$ is the symbol for the meta-carborane isomer and $n$ is an integer from 1 to 8.

24. The polymeric substituted-carboranyl phosphate of $HO(CH_2)_2 \oplus CH_2OCH_2 \oplus CH_2OH$, wherein $\oplus$ is the symbol for the meta-carborane isomer.

No references cited.

CHARLES B. PARKER, *Primary Examiner.*

ANTON H. SUTTO, *Assistant Examiner.*

U.S. Cl. X.R.

252—77; 260—745.7